(12) United States Patent
Moriya (10) Patent No.: US 6,690,441 B2
(45) Date of Patent: Feb. 10, 2004

(54) MULTI-DOMAIN VERTICAL ALIGNMENT MODE LIQUID CRYSTAL DISPLAY HAVING SPACERS FORMED OVER ZIGZAG LIKE ALIGNMENT-CONTROLLING PROJECTION

(75) Inventor: Norihisa Moriya, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/956,240

(22) Filed: Sep. 20, 2001

(65) Prior Publication Data

US 2002/0067450 A1 Jun. 6, 2002

(30) Foreign Application Priority Data

Sep. 22, 2000 (JP) ........................................ 2000-289238

(51) Int. Cl.[7] ..................... G02F 1/1337; G02F 1/1339; G02F 1/1335; G02F 1/1333
(52) U.S. Cl. ...................... 349/130; 349/129; 349/156; 349/157; 349/106; 349/110
(58) Field of Search ................................ 349/123, 129, 349/130, 156, 157, 106, 110

(56) References Cited

U.S. PATENT DOCUMENTS

| | | | | |
|---|---|---|---|---|
| 6,339,462 B1 | * | 1/2002 | Kishimoto et al. | 349/156 |
| 6,437,847 B1 | * | 8/2002 | Kishimoto | 349/155 |
| 6,466,296 B1 | * | 10/2002 | Yamada et al. | 349/160 |
| 6,493,050 B1 | * | 12/2002 | Lien et al. | 349/106 |
| 2001/0026347 A1 | * | 10/2001 | Sawasaki et al. | 349/156 |
| 2001/0055088 A1 | * | 12/2001 | Kume et al. | 349/156 |
| 2002/0063839 A1 | * | 5/2002 | Matsumoto | 349/156 |
| 2002/0145698 A1 | * | 10/2002 | Imai et al. | 349/156 |

FOREIGN PATENT DOCUMENTS

| | | |
|---|---|---|
| JP | 29-47350 | 7/1999 |
| JP | 11-242225 | 9/1999 |

* cited by examiner

*Primary Examiner*—Tarifur R. Chowdhury
(74) *Attorney, Agent, or Firm*—Parkhurst & Wendel, L.L.P.

(57) ABSTRACT

Disclosed herein is a multi-domain vertical alignment (MVA) mode liquid crystal display that can be produced with high reliability, that is free from lowering of luminance to be caused by disclination lines and that can display an image with high contrast over the entire display area. This MVA mode liquid crystal display comprises a driving electrode layer, a transparent electrode layer, spacers for maintaining a predetermined distance, provided just light pillars or ribs between the driving electrode layer and the transparent electrode layer, a liquid crystal layer comprising liquid crystals having negative dielectric anisotropy, placed between the driving electrode layer and the transparent electrode layer, vertical alignment layers for vertically aligning the liquid crystals, respectively provided on the driving electrode layer side surface and the transparent electrode layer side surface of the liquid crystal layer, alignment-controlling projections for controlling the direction of alignment of the liquid crystals, linearly provided on the liquid crystal side surface of the driving electrode layer and/or that of the transparent electrode layer, and a color layer, wherein the spacers are provided at the position which overlaps the alignment-controlling projections.

40 Claims, 6 Drawing Sheets

MULTI-DOMAIN VERTICAL ALIGNMENT MODE LIQUID CRYSTAL DISPLAY HAVING SPACERS FORMED OVER ZIGZAG LIKE ALIGNMENT-CONTROLLING PROJECTION

BACKGROUND OF THE INVENTION

1. Field of the Invention

The present invention relates to a liquid crystal display (LCD), and, more particularly, to a multi-domain vertical alignment mode liquid crystal display (MVA-LCD).

2. Background Art

Since liquid crystal displays are thin and light, consume less electric power and do not cause flickering, they have rapidly acquired new markets, especially the laptop personal computer market. In recent years, there has been generated the demand for liquid crystal displays as the monitors of desktop personal computers, which are larger than the displays of laptop personal computers. Moreover, liquid crystal displays are now replacing the CRT displays of televisions.

The above-described large-sized liquid crystal displays particularly require luminance, contrast, etc. that are even over the entire display surfaces regardless of the angle of observation. However, twisted nematic mode liquid crystal displays (hereinafter referred to as TN-LCD's) that have been widely used heretofore have such a great problem that the viewing-angle is narrow.

To solve the above problem, a variety of improved modes such as the in-plane switching (IPS) mode and the optical compensation TN mode have recently been developed. Of these improved modes, the multi-domain vertical alignment mode (hereinafter referred to as MVA mode) is now attracting attention because it can attain (1) wide viewing angle, (2) high contrast, (3) high response speed, (4) high fidelity to color reproduction, and (5) high accuracy. In this MVA mode, displaying is controlled by inclining, by the application of a voltage, liquid crystal molecules that are vertically aligned on an alignment layer when no voltage is applied. Moreover, in order to attain high definition displaying, the direction in which liquid crystal molecules in one domain are inclined is made different from the direction in which liquid crystal molecules in a neighboring domain are inclined.

Initially proposed to attain the so-called multi-domain alignment as described above was such a technique that mask rubbing is repeated two or more times. This technique is however disadvantageous in that the yield is decreased because static electricity is generated and dust is raised in the rubbing step and that the productivity is decreased because the process is complicated. Thus, the manufacturing process employing this technique has not been fully reliable.

Under these circumstances, such a technique that projections are provided inside a liquid crystal panel to control the direction in which liquid crystal molecules are inclined, as described in Japanese Patent Publication No. 2947350, has recently come to be adopted instead of the rubbing technique. In this technique, the projections for controlling the alignment of liquid crystal molecules are provided as zigzag lines arranged in stripes. Therefore, when a voltage is applied, liquid crystal molecules are aligned evenly in four different directions with the long axes of the molecules inclined to form, in the horizontal direction, an angle of 45° with the central axis of the zigzag line. More specifically, the projections are so designed that they can divide one pixel into 4 sections whose areas are all the same and that they can control the directions of alignment of liquid crystals included in these 4 sections different from one another. Further, in this technique, the alignment-controlling projections are provided on both the color filter side and the array side so that they will be alternately arranged after cells are created.

Further, such a structure has also been devised recently that slits are formed in an ITO film as imaginary alignment-controlling projections, instead of the alignment-controlling projections to be provided on the array side.

In an MVA mode liquid crystal display provided with alignment-controlling projections, spherical spacer beads are usually used as spacers for defining the thickness of a liquid crystal layer. To fabricate such a liquid crystal display, a color filter substrate and an array substrate are adhered to each other with spacer beads having a predetermined diameter sandwiched between them. In this case, however, the alignment of liquid crystal molecules in the vicinity of the spacer beads is disrupted. As a result, double refraction takes place even when displaying is in the dark state, and leakage of light thus occurs to decrease the contrast, while the luminance at the time of light-state displaying is decreased due to disclination lines. In addition, spacer beads are, in general, sprinkled from a distant position, so that it is impossible to specify the positions of the individual spacer beads scattered on a substrate. It is therefore difficult to control the density of the spacer beads in a microscopic area. Moreover, the beads can move slightly even after cells are created. In addition, since the spacer beads that are extremely small tend to scatter in the air when they are sprinkled in a clean room, a liquid crystal display cannot be produced with satisfactorily high reliability. Unlike the conventional TN mode, the MVA mode is a double refraction mode utilizing the double refraction of liquid crystals, so that highly accurate control of the thickness of a liquid crystal layer is particularly required over the entire display area. For this reason, there have been demanded spacers that are more accurate than the conventional spacer beads.

SUMMARY OF THE INVENTION

We found that it is possible to produce, with high reliability, a multi-domain vertical alignment mode liquid crystal display that is free from lowering of luminance to be caused by disclination lines and that can display images with high contrast over the entire display area by providing, instead of spacer beads, spacers just like pillars or ribs between a driving electrode layer and a transparent electrode layer, at the position which overlaps alignment-controlling projections for controlling the direction of alignment of liquid crystals. The present invention was accomplished on the basis of this finding.

An object of the present invention is therefore to provide an MVA mode liquid crystal display that can be produced with high reliability, that is free from lowering of luminance to be caused by disclination lines and that can display images with high contrast over the entire display area; and a color filter for use in this liquid crystal display.

To fulfil the above object, the present invention provides a multi-domain vertical alignment mode liquid crystal display comprising:

a driving electrode layer in which driving electrodes corresponding to pixels are two-dimensionally arranged;

a transparent electrode layer for generating, together with the driving electrode layer, an electric field between the two electrode layers, provided in parallel with the driving electrode layer at a predetermined distance;

spacers for keeping the predetermined distance, provided just like pillars or ribs between the driving electrode layer and the transparent electrode layer;

a liquid crystal layer comprising liquid crystals having negative dielectric anisotropy, placed between the driving electrode layer and the transparent electrode layer;

vertical alignment layers for vertically aligning the liquid crystals, respectively provided on the driving electrode layer side surface and the transparent electrode layer side surface of the liquid crystal layer;

alignment-controlling projections for controlling the direction of alignment of the liquid crystals, linearly provided on the liquid crystal layer side surface of the driving electrode layer and/or that of the transparent electrode layer; and a color layer having a colored pixel pattern of two or more colors, wherein the spacers are provided at the position which overlaps the alignment-controlling projections; each spacer has at least one pair of side faces that are parallel to the longer direction of the alignment-controlling projection; and the horizontal area covered by the alignment-controlling projection encompasses the horizontal area covered by the spacer, or the horizontal area covered by the spacer partially or entirely extends beyond the horizontal area covered by the alignment-controlling projection, the horizontal distance between the alignment-controlling projection and the side face of the spacer extending beyond the alignment-controlling projection in the latter case being not more than 7 μm when measured at the base of the alignment-controlling projection/spacer.

The present invention also provides a color filter for use in a multi-domain vertical alignment mode liquid crystal display, comprising:

a substrate, a color layer having a colored pixel pattern of two or more colors, formed on the substrate, an electrode layer formed on the color layer, alignment-controlling projections for controlling the direction of alignment of liquid crystals, linearly provided on the electrode layer, and spacers for maintaining the thickness of the liquid crystals, provided just like pillars or ribs at the position which overlaps the alignment-controlling projections, wherein the spacer has at least one pair of side faces that are parallel to the longer direction of the alignment-controlling projection; and the horizontal area covered by the alignment-controlling projection encompasses the horizontal area covered by the spacer, or the horizontal area covered by the spacer partially or entirely extends beyond the horizontal area covered by the alignment-controlling projection, the horizontal distance between the alignment-controlling projection and the side face of the spacer extending from the alignment-controlling projection in the latter case being not more than 7 μm when measured at the base of the alignment-controlling projection/spacer.

DETAILED DESCRIPTION OF THE INVENTION

The MVA mode liquid crystal display of the present invention will be specifically described hereinafter.

MVA Mode Liquid Crystal Display

Figure 1:
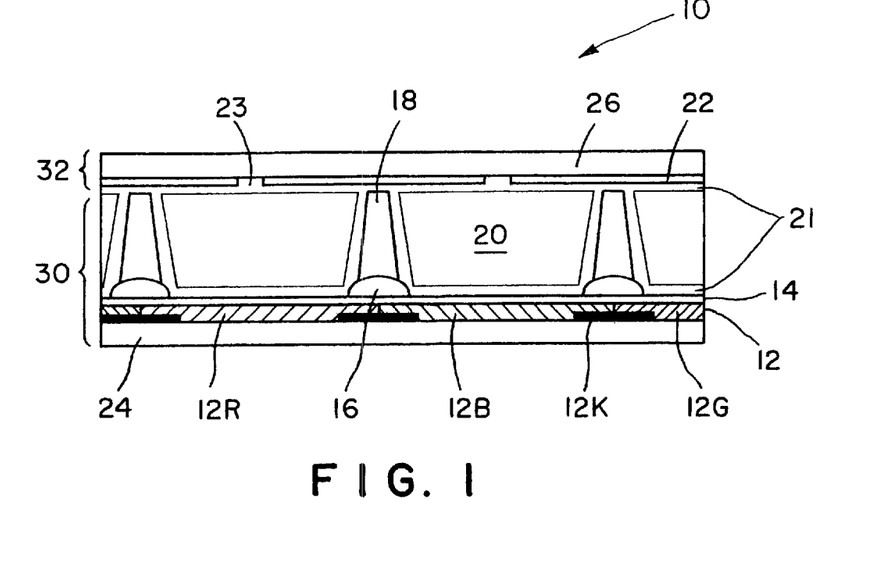
FIG. 1 is a diagrammatic sectional view showing one example of the multi-domain vertical alignment mode liquid crystal display and color filter according to the present invention.

FIG. 1 is a diagrammatic sectional view showing one example of the MVA mode liquid crystal display of the present invention. As shown in this figure, the MVA mode liquid crystal display 10 is a transmission liquid crystal display comprising a color layer 12, a transparent electrode layer 14, alignment-controlling projections 16, spacers 18, a liquid crystal layer 20, vertical alignment layers 21, and a driving electrode layer 22.

Figure 2:
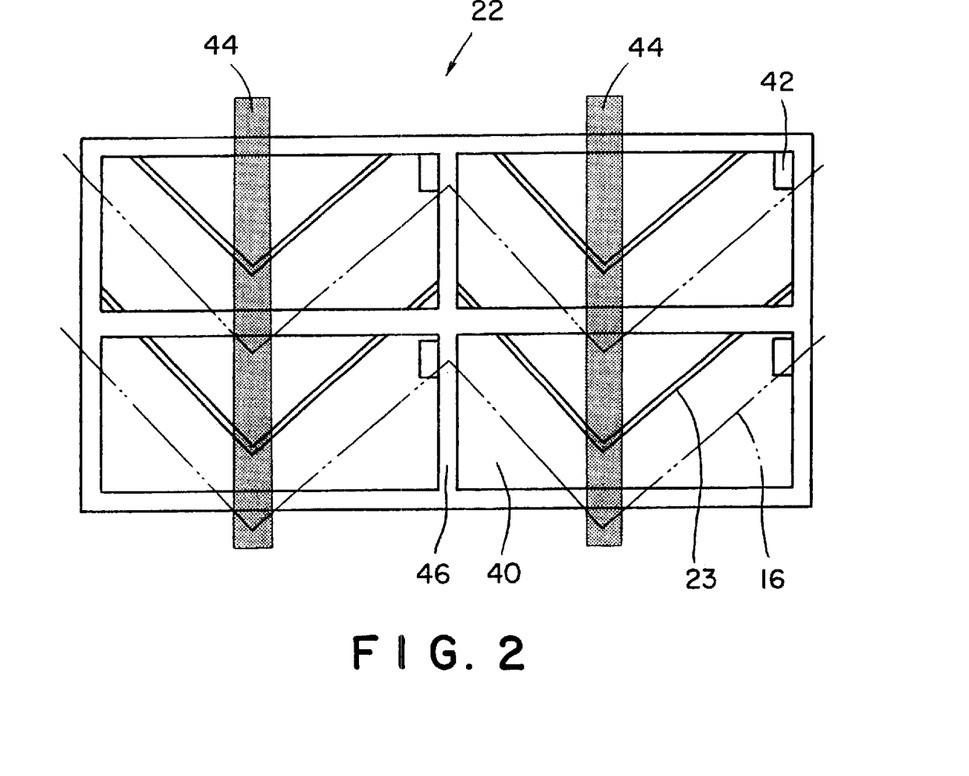
FIG. 2 is a diagrammatic view showing the constitution of the driving electrode layer in the liquid crystal display shown in FIG. 1.

The driving electrode layer 22 is an electrode layer in which driving electrodes corresponding to pixels are two-dimensionally arranged. One example of the constitution of the driving electrode layer 22 is diagrammatically shown in FIG. 2. The constitution of the driving electrode layer 22 shown in FIG. 2 is as follows: electrodes corresponding to pixels are formed as pixel electrodes 40 by patterning; a thin-film transistor (TFT) 42, a switching element, is mounted on each pixel electrode 40 to control it; and a supplemental capacitor 44 is also provided on each pixel to sufficiently retain applied electric charges for a predetermined time. Further, as shown in FIG. 1, the driving electrode layer 22 is supported by a substrate 26, and both the driving electrode layer 22 and the substrate 26 are transparent so that they can transmit light emitted from a backlight.

It is preferable to form the transparent driving electrode layer 22 by the use of indium tin oxide (ITO), zinc oxide (ZnO), tin oxide (SnO), or an alloy of any of these compounds. Further, any conventional film deposition process such as sputtering, vacuum deposition or chemical vapor deposition may be used to form the driving electrode layer 22.

The transparent substrate may be made from a transparent rigid material having no flexibility such as silica glass, Pyrex glass or a synthetic silica board, or a transparent flexible material such as a transparent resin film or a resin board useful for optical instruments. It is noted that the present invention is also applicable to reflection liquid crystal displays. In this case, the driving electrode layer 22 and the substrate 26 may be made from an opaque or semitransparent material.

The transparent electrode layer 14 is provided in parallel with the driving electrode layer 22 at a predetermined distance; this electrode layer generates, together with the driving electrode layer 22, an electric field between the two electrode layers. Any one of various transparent electrode layers that can be used for liquid crystal displays is herein employable as the transparent electrode layer 14. It is preferable to form the transparent electrode layer 14 by the use of indium tin oxide (ITO), zinc oxide (ZnO), tin oxide (SnO), or an alloy of any of these compounds. Further, any conventional film deposition process such as sputtering, vacuum deposition or chemical vapor deposition may be used to form this electrode layer.

The transparent electrode layer 14 shown in the figure is supported by a substrate 24, which is also transparent so that it can transmit light. This transparent substrate 24 may be made from any of the above-described materials suitable for the transparent substrate 26.

The color layer 12 has a pixel pattern of two or more colors, and imparts one color selected from red, blue and green to each pixel. This color layer 12 may have the same constitution as that of the known color layers of color filters for use in liquid crystal displays, and there is no particular limitation on the constitution. Namely, the color layer 12 has a colored pixel pattern composed of two-dimensionally, regularly repeated picture elements, each picture element consisting of three pixels of red pixel 12R, green pixel 12G and blue pixel 12B. For the color layer for use in the present invention, the combination of complementary colors of cyan, magenta and yellow may be adopted instead of the combination of red, blue and green. This color layer 12 contains colorants such as dyes or pigments, and can be formed by a known technique such as a pigment-dispersion, dying or electro-deposition process. The colored pixel pattern may be of any type such as stripe, mosaic, triangle or 4 pixel-arranged type. In the present invention, the color layer 12 can be provided in any position in the liquid crystal display. In the liquid crystal display 10 shown in the figure, the color layer 12 is provided between the transparent electrode layer 14 and the transparent substrate 24. However, it is also possible to provide the color layer 12 between the driving electrode layer 22 and the substrate 26, or in any other position.

According to a preferred embodiment of the present invention, the color layer 12 may contain a black matrix layer 12K that is black in color and that has light-shielding properties. The black matrix layer 12K shown in the figure is provided between each two colored pixels in the colored pixel pattern composed of red pixel 12R, green pixel 12G and blue pixel 12B. If the black matrix layer is thus provided, the contrast is improved, and high definition displaying can thus be attained. Any material can be used to form the black matrix layer 12K, and chromium oxide, a black-colored resin, or the like can favorably be used for this purpose. The black matrix layer may also be formed separately from the color layer 12. In this case, the black matrix layer may be positioned on the observer side of the liquid crystal layer, or on the side opposite to it (the backlight side).

The alignment-controlling projections 16 are projections for controlling the direction of alignment of liquid crystals, linearly provided on the liquid crystal layer side surface of the transparent electrode layer 14 and/or that of the driving electrode layer 22. The alignment-controlling projection 16 is formed so that its cross section will be like a mountain with slants. This projection aligns, vertically to the slants, those liquid crystal molecules that are in contact with it. Therefore, by applying a voltage to the liquid crystal layer, it is possible to align liquid crystal molecules in each domain in a predetermined direction, starting from the inclined liquid crystal molecules that are present in the vicinity of the projection. It is thus possible to align the liquid crystals symmetrically about the apex of the mountain of the alignment-controlling projection, at an angle of 180° in the horizontal direction, and at an inclined angle in the vertical direction. When two or more sets of the above two neighboring domains are combined to display one pixel, an observer can constantly see the same image even when the angle of observation is changed vertically to the alignment-controlling projections. This means that wide viewing angle can be ensured. It is preferable that the alignment-controlling projections be provided linearly, especially in the shape of zigzag lines. However, they are not limited to this, and may be formed in dotted lines or the like.

The alignment-controlling projections 16 may be formed by the use of a photoresist material containing an acrylic resin. A conventional technique such as photolithography can favorably be used to form the projections. The alignment-controlling projections 16 can be provided on both the transparent electrode layer 14 side and the driving electrode layer 22 side. Alternatively, the alignment-controlling projections 16 may be provided only on the transparent electrode layer 14 side or on the driving electrode layer 22 side, and slits, which will be described later in detail, may be formed on the electrode layer on which the alignment-controlling projections are not provided. In the liquid crystal display 10 shown in the figure, the alignment-controlling projections 16 are formed only on the transparent electrode layer 14, and the driving electrode layer 22 on which the alignment-controlling projections are not formed has linearly cut-out slits 23 so that an electric field can be generated in a predetermined direction between the driving electrode layer 22 and the alignment-controlling projections 16. It is also possible to form the alignment-controlling projections 16 only on the driving electrode layer 22, and slits are formed in the transparent electrode layer 14 on which the alignment-controlling projections are not formed. At any rate, it is preferable to alternately form the alignment-controlling projections 16 and/or the slits 23 in stripes at a predetermined distance because, if the projections and/or slits are so formed, it is easy to make the directions of electric fields in each two neighboring domains symmetrical.

According to a preferred embodiment of the present invention, the alignment-controlling projections 16 are provided as zigzag lines arranged in parallel stripes, where each zigzag line has turnings at a predetermined interval with a bent angle of 90 degrees. By this, it is possible to obtain viewing angle characteristics completely symmetrical not only with the direction vertical to the lines of the alignment-controlling projections but also with all directions of up and down and of right and left. Namely, in view of the turning of the zigzag line of the alignment-controlling projection with the bent angle of 90 degrees, the total directions of alignment of liquid crystals, which is derived from the symmetry with an angle of 180 degrees in the horizontal direction, are different by 90 degrees between two neighboring domains about the turning. Therefore, the liquid crystals are to be grouped into 4 domains by the turning and linear parts of the zigzag line of the alignment-controlling projection. The liquid crystal molecules in each domain are aligned with their long axes inclined at an angle of 45 degrees in the direction horizontal to the central axis of the zigzag line, and inclined in the direction vertical to the same; the liquid crystals in the 4 domains are thus aligned in four different directions. Consequently, the 4 domains that are symmetrically defined display one pixel, so that an observer can constantly see the same image in the all directions of up and down and of right and left.

Figure 3:
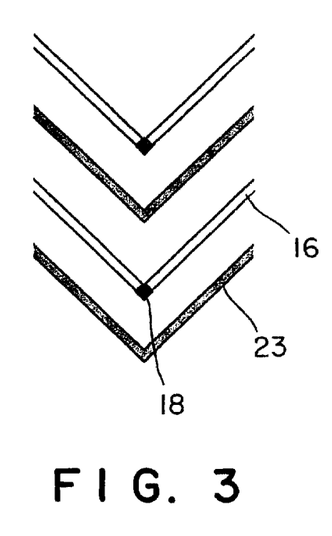
FIG. 3 is a plane view showing one example of the positional relationship between the alignment-controlling projections and slits provided as zigzag lines and the spacers in the liquid crystal display shown in FIG. 1.
Figure 4:
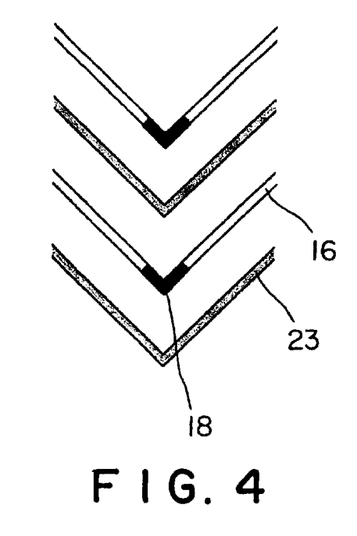
FIG. 4 is a plane view showing another example of the positional relationship between the alignment-controlling projections and slits provided as zigzag lines and the spacers in the liquid crystal display shown in FIG. 1.

It is preferred that the slits 23 be formed in the same shape as that of the alignment-controlling projections 16 and in parallel with them. In the case where the alignment-controlling projections 16 are formed in zigzag lines as shown in FIGS. 3 and 4, it is preferable that the slits 23 be also formed in zigzag lines having turnings at the same interval as that in the zigzag lines of the alignment-controlling projections. More preferably, the slits 23 are provided so that one slit will be positioned at the center of the space between two neighboring alignment-controlling projections 16 between which the liquid crystal layer is present, and that the slits and the alignment-controlling projections will be alternately arranged in stripes. If the slits are provided in this manner, the alignment of the liquid crystals in each domain can be precisely controlled when a voltage is applied.

The spacers 18 are elements that are placed just like pillars or ribs between the transparent electrode layer 14 and the driving electrode layer 22 to keep the distance between these two layers a predetermined value, thereby defining the thickness of the liquid crystal layer. When such spacers are used, it becomes possible to solve the conventional problems associated with the use of spacer beads, and to enhance the reliability of manufacturing process. A highly accurately controlled display can thus be obtained.

In the present invention, the spacer 18 has at least one pair of side faces that are parallel to the longer direction of the alignment-controlling projection 16, and is provided just like a pillar or rib at the position which overlaps the alignment-controlling projection 16. It is noted that there are two longer directions at the turning of the zigzag line of the alignment-controlling projection; in this specification, however, either one of the two is defined as the longer direction. If the spacer has the above-described side faces, when a voltage is applied, the direction in which liquid crystals existing in the vicinity of the side faces of the spacer are inclined virtually agrees with the direction in which liquid crystals existing in the vicinity of the alignment-controlling projection are inclined. Consequently, substantially no disclination lines newly appear, and luminance as high as that in the case where no spacer is provided can be attained. For this reason, it is also possible, according to this embodiment, to provide the spacers even in the effective display area.

Further, it is preferred that the horizontal area covered by the alignment-controlling projection 16 encompasses the horizontal area covered by the spacer 18. Namely, in this case, the base of the spacer is substantially equal to or smaller than that of the alignment-controlling projection. By so making the spacers, it is possible to completely prevent them from forming new disclination lines and from bringing about the leakage of light. Alternatively, the horizontal area covered by the spacer may slightly laps out of the horizontal area covered by the alignment-controlling projection. In other words, the horizontal area covered by the spacer may partially or entirely extends beyond the horizontal area covered by the alignment-controlling projection. In this case, the horizontal distance (i.e., discrepancy) between the alignment-controlling projection and the side face of the spacer extending beyond the alignment-controlling projection should be not more than 7 $\mu$m, preferably not more than 5 $\mu$m, more preferably not more than 3 $\mu$m when measured at the base of the alignment-controlling projection/spacer. As long as the horizontal distance falls in this range, the formation of disclination lines and the leakage of light hardly occur. Further, in this case, it is possible to ensure larger spacer area, and, moreover, the production of the spacers becomes relatively easy from the viewpoint of production process.

Thus, if the spacer of the present invention is adopted, disclination lines do not newly appear, and it becomes possible to freely establish the size of the spacer without undergoing decrease in the luminance of the liquid crystal display. It must be realized that this advantageous point is very important when viewed also from the facts described in the following items i) and ii).

i) In a conventional MVA mode liquid crystal display, providing spacers in gaps between pixel electrodes seems to be acceptable. In this case, no electric field is generated in these gaps, so that displaying is always in the dark state. To avoid this phenomenon, black matrix is usually provided. As a result, it becomes possible to prevent, to some extent, leakage of light that takes place in these gaps due to the spacers. On the other hand, it is the recent tendency that the size of the black matrix and the gap between pixels are made smaller to obtain a highly accurate display with a high aperture ratio. However, spacers are required to be large enough to maintain the cell gap, so that they tend to extend beyond the black matrix. There is therefore such a possibility that disclination lines appear in the effective display area because the alignment of liquid crystals in the vicinity of the side faces of the spacers is disrupted.

ii) It seems also possible that spacers are placed in supplemental capacitor sections provided in the inside of pixels in which an electric field is generated when a voltage is applied. In this case, however, disclination lines appear when displaying is in the light state, and can extend to the effective display area. Like black matrix, the supplemental capacitor tends to be made smaller in order to ensure sufficiently large aperture area, so that the possibility of disclination lines appearing becomes greater.

Further, the production of an MVA mode liquid crystal display having alignment-controlling projections requires no rubbing step. Therefore, in principle, no those parts are brought about that are not rubbed due to the existence of projections for controlling the thickness of a liquid crystal layer, so-called shadow parts, unlike in conventional TN-LCD's and the like. This is another advantageous point of the above-described arrangement of the spacers and slits.

It is possible to make the spacer 18 somewhat wider than the alignment-controlling projection 16 as long as it is provided at the position which overlaps the alignment-controlling projection. The width of the spacer 18 may also be made smaller than that of the alignment-controlling projection. The spacers may be provided at the turnings of the zigzag lines of the alignment-controlling projections, or on the linear parts of the same other than the turnings.

The above-described spacers and/or alignment-controlling projections may be colored or transparent, and there is no particular limitation on this point.

To highly precisely control the cell gap over the entire cell area, it is desirable to provide a plurality of spacers having a sufficiently large area. In the present invention, since the spacers are provided at the position which overlaps the alignment-controlling projections, no disclination line newly appears even if the spacers are provided in the effective display area. The effective display area herein means the area in which an image is effectively displayed without being shaded by black matrix. It is therefore possible to provide rib-like spacers in any position whether it is inside the effective display area or not as long as it is at the position which overlaps the alignment-controlling projections. Thus, according to this embodiment, it is possible to easily increase the spacer area while preventing formation of new disclination lines.

According to a preferred embodiment of the present invention, the spacers are provided on the alignment-controlling projections at the turnings of the zigzag lines thereof. As will be clear also from FIG. 6, which will be explained later, when a voltage is applied, liquid crystal molecules that are inclined from two directions strike each other on the line connecting the turnings. Therefore, these crystal liquid molecules align almost vertically, and the transmission of light is thus drastically suppressed. For this reason, those areas in the vicinity of the lines connecting the turnings of the zigzag lines of the alignment-controlling projections appear always dark. When the spacers are placed in such areas, disclination lines that appear due to the spacers are merged into the disclination lines originally existing due to the alignment-controlling projections, so that no disclination lines are newly formed apparently. Namely, the alignment of liquid crystals is not affected at all as long as the spacers are provided on the alignment-controlling projections at the turnings of the zigzag lines thereof. Further, in the case where the alignment-controlling projections are formed by the use of a transparent material, there is a bare possibility that the spacers can be observed as dark dots when displaying is in the light state if the spacers are provided on the alignment-controlling projections but not at the turnings of the zigzag lines thereof. On the contrary, if the spacers, which may potentially cause dark dots when displaying is in the light state, are provided at the turnings of the zigzag lines of the alignment-controlling projections, they are concealed at least partially, so that the luminance is more efficiently increased.

The spacer may be provided so that it will extend upward from the square base positioned at the turning as shown in FIG. 3, or from the V-shaped base including the turning and its vicinity as shown in FIG. 4.

Further, according to a preferred embodiment of the present invention, the black matrix layer 12K may be formed in the color layer 12 or separately from the color layer 12 to mask at least a part of the turnings of the zigzag lines of the alignment-controlling projections for light shielding. Furthermore, according to a preferred embodiment of the present invention, the driving electrode layer 22 may have the supplemental capacitor sections 44 as shown in FIG. 2; the supplemental capacitor sections 44 may mask at least a part of the turnings of the zigzag lines of the alignment-controlling projections for light shielding.

Figure 5:
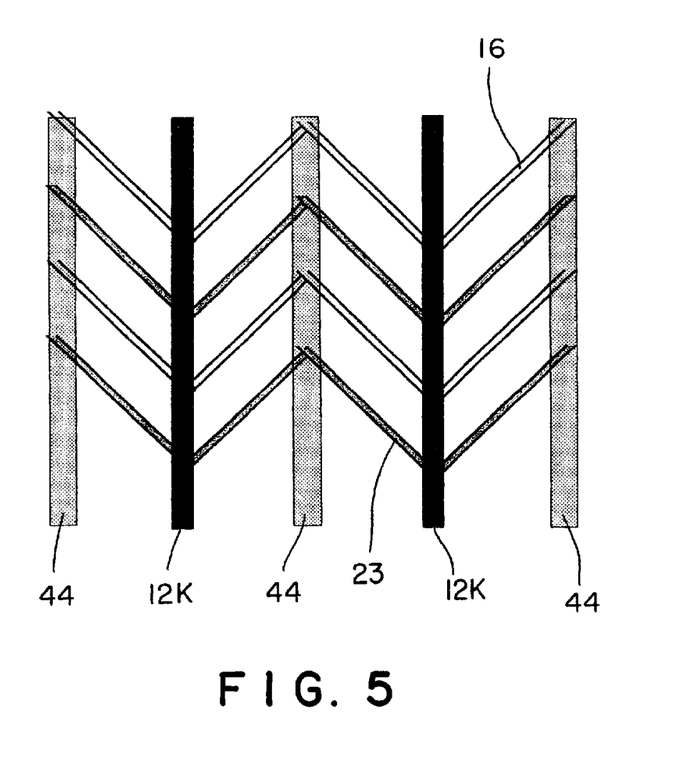
FIG. 5 is a diagrammatic view showing the configurational relationship between the black matrix layer and the supplemental capacitor in the liquid crystal display shown in FIG. 1.

The turnings of the zigzag lines of the alignment-controlling projections may be masked by either one of the black matrix layer 12K and the supplemental capacitor 44, and it is more preferable to use these two to mask the turnings. One preferable example of the positional relationship between the black matrix layer and the supplemental capacitor in the latter case is shown in FIG. 5. As shown in this figure, since the zigzag lines of the alignment-controlling projections 16 and those of the slits 23 are arranged in parallel stripes, the lines connecting the turnings of these zigzag lines are straight; and the black matrix layers 12K and the supplemental capacitor sections 44 are alternately positioned on these straight lines. As shown in FIG. 2, the turnings can exist not only in the gaps between the pixel electrodes masked by the black matrix layers, but also on the pixel electrodes on which an electric field is generated when a voltage is applied. By taking the following measure, therefore, it is possible to effectively prevent the appearance of dark disclination lines to ensure higher luminance at the time of light-state displaying; the turnings positioned in the gaps between the pixel electrodes are masked by the black matrix layers 12K, while the turnings located in the pixel electrodes are masked by the supplemental capacitor sections 44; and the spacers (not shown in the figure) are provided at these turnings.

In the present invention, the spacers 18 may be in any shape. A preferable example is tapered spacers 18 extending upward from the bases of the alignment-controlling projections 16 as shown in FIG. 1. As long as such spacers are provided, the spacers do not disrupt the alignment of liquid crystals that is controlled by the alignment-controlling projections. Also in the case where the base of the spacer is smaller than that of the alignment-controlling projection, the similar effect can be expected.

According to a preferred embodiment of the present invention, the area covered by the alignment-controlling projection encompasses the area covered by the spacer. It is therefore possible to precisely control the cell gap without virtually losing the function of the alignment-controlling projections. The alignment of liquid crystals in the desired direction can thus be successfully attained.

According to a preferred embodiment of the present invention, the spacer 18 has side faces substantially composed of those side faces that are parallel to the longer direction of the alignment-controlling projection 16 and those sidefaces that are perpendicular to the same. Namely, those side faces of the spacer other than the side faces that are parallel to the longer direction of the alignment-controlling projection are made vertical to the longer direction of the same. These vertical side faces do not disrupt the alignment of liquid crystals on the alignment-controlling projection, so that they bring about neither the formation of new disclination lines nor the leakage of light. More detailed explanation of this is as follows. Liquid crystals on the alignment-controlling projection inherently tend to align in the longer direction of the alignment-controlling projection. The direction in which liquid crystals are aligned due to the side faces of the spacer that are perpendicular to the longer direction is vertical to these side faces of the spacer, and this direction agrees with the longer direction of the alignment-controlling projection. Therefore, even if the spacers are provided, the direction in which liquid crystals on the alignment-controlling projections are aligned remains basically unchanged. For this reason, it is possible, according to this embodiment, to provide the spacers even in the effective display area.

The spacer 18 in the above-described embodiment may be in any shape as long as it has the above-described side faces; it may be a pillar-like one having a square horizontal section as shown in FIG. 2, or a rib-like one having a V-shaped horizontal section as shown in FIG. 3. According to a preferred embodiment of the present invention, the height of the spacer is preferably from 1 to 10 µm, more preferably from 1 to 8 µm, and most preferably from 2 to 7 µm.

Further, according to a preferred embodiment of the present invention, the spacers are formed by the use of an ultraviolet sensitive resin, more preferably a negative resist containing a photopolymerization initiator. Acrylic negative resists having acidic groups such as carboxylic acid group are preferred for this purpose, and "NN 700" manufactured by JSR Corporation, Japan is more preferred from the viewpoint of shape retention. When an ultraviolet sensitive resin is used, spacers can be efficiently formed through a very simple operation, that is, by firstly printing a negative resist pattern on an electrode layer by a conventional technique, and applying ultraviolet light to this resist pattern, so that high productivity can be attained.

The liquid crystal layer 20 consists of liquid crystals that are vertically oriented when no voltage is applied and that can be aligned non-vertically when a voltage is applied. The gap between the transparent electrode layer 14 and the driving electrode layer 22 is filled with such liquid crystals to form the liquid crystal layer 20. Specifically, liquid crystals having negative dielectric anisotropy, that is, those liquid crystal molecules whose dielectric constant in the direction of long axis is smaller than that in the direction of short axis, are used in the present invention.

Vertical alignment layers 21 for vertically aligning the liquid crystals are respectively provided on the driving electrode layer side surface and the transparent electrode layer side surface of the liquid crystal layer 20. By doing so, it becomes possible to allow the liquid crystals to orient vertically when no voltage is applied, and to incline them in a predetermined direction that is controlled by the alignment-controlling injections, etc. when a voltage is applied. The vertical alignment layers 21 may be formed by a procedure including screen-printing, removal of solvents and baking, using a material such as polyimide that can align vertically. Any other method can be used to form the vertical alignment layers 21.

According to a preferred embodiment of the present invention, a backlight (not shown in the figure) is provided outside the driving electrode layer 16 or the transparent electrode layer 14, whereby it becomes possible to display a desired high-quality image with sufficiently high luminance. The present invention is not limited to transmission liquid crystal displays, and also applicable to reflection liquid crystal displays. In the latter case, it is not necessary to provide a backlight.

Color Filter

It is possible to produce an MVA mode liquid crystal display of the present invention by laminating the above-described constituent layers. It is however preferable, from the viewpoint of efficiency, to make the liquid crystal display in the following manner: a color filter comprising the spacers of the present invention is made in advance, and adhered to an array that should face the color filter; those spaces created by the spacers are then filled with liquid crystals.

The liquid crystal display shown in FIG. 1 is composed of a color filter 30 provided with the spacers 18 of the present invention, a conventional array 32, and a liquid crystal layer 20 sandwiched between the color filter 30 and the array 32. Namely, the color filter 30 shown in FIG. 1 is composed of a substrate 24, a color layer 12 formed on the substrate, an electrode layer 14 formed on the color layer, alignment-controlling projections 16 linearly provided on the electrode layer, and spacers 18 provided just like pillars or ribs at the position which overlaps the alignment-controlling projections. The electrode layer 14 may be a driving electrode layer or simple transparent electrode layer. The color filter of the present invention may be provided on the observer side or on the side opposite to it. The constitution of each layer is as mentioned previously for the liquid crystal display 10.

According to a preferred embodiment of the present invention, a vertical alignment layer 21 for vertically aligning liquid crystals is formed on the electrode side surface of the color filter 30. The liquid crystal layer can therefore be formed in a very simple manner, that is, by filling the gap between the color filter and the array with liquid crystals.

Array

In the MVA mode liquid crystal display of the present invention, the spacers may be provided not only on the color filter side but also on the array side. In the latter case, it is preferable, from the viewpoint of efficiency, to fabricate the liquid crystal display in the following manner: an array having the spacers of the present invention is made in advance, and adhered to a color filter that should face the array; the spaces created by the spacers are then filled with liquid crystals.

An array that can favorably be used in the present invention comprises a substrate, a driving electrode layer formed on the substrate, alignment-controlling projections for controlling the direction of alignment of liquid crystals, linearly provided on the driving electrode layer, and spacers for maintaining the thickness of the liquid crystals, provided just like pillars or ribs at the position which overlaps the alignment-controlling projections. Namely, the array of the present invention is the same as the aforementioned color filter 30 of the invention from which the color layer is eliminated. The array may be provided on the observer side or on the side opposite to it. The constitution of each layer in the array is as mentioned previously for the liquid crystal display 10.

Action

In the liquid crystal display 10 of the present invention thus obtained, if a backlight (not shown in the figure) is provided on the driving electrode layer 22 side, light emitted from the backlight passes through the substrate 26, the driving electrode layer 22 and the vertical alignment layer 21, and enters into the liquid crystal layer 20. On the other hand, a voltage is applied only to desired pixels, where ON/OFF of a predetermined voltage to be applied to a pixel by the driving electrode layer 22 and the transparent electrode layer 14 is controlled by a thin-film transistor (TFT) mounted on each pixel. Liquid crystals in a domain to which no voltage is applied are vertically oriented, so that light cannot pass through this domain, while liquid crystals in a voltage-applied domain are aligned in the direction (non-vertical direction) that is controlled by the alignment-controlling projections, so that light can pass through this domain. The transmitted light passes through the vertical alignment layer 21, the transparent electrode layer 14, the red 12R, green 12G and blue 12B sections of the color layer 12 and the transparent substrate 26, and finally sensed by an observer as colored light. By subjecting all pixels to the above-described control, it is possible to finally output a desired color image.

EXAMPLES

The present invention will now be explained more specifically by referring to the following examples. However, these examples are not intended to limit the scope of the present invention in any way.

Example 1
Production of Color Filter and Liquid Crystal Display
(a) Production of Color Filter A glass substrate was firstly prepared as the transparent substrate 24. This glass substrate was cleaned by proper treatment, and a chromium oxide layer was formed on it by sputtering. Subsequently, a positive resist was applied to this substrate, and etched to form a black matrix layer 12K. "Color Mosaic CR-2000", "Color Mosaic CG-2000" and "Color Mosaic CB-2000" were procured from Fuji Hunt Electronics Technology Co., Ltd., Japan as red, green and blue ultraviolet-curing resists, respectively. The glass substrate on which the black matrix layer had been formed was spin-coated with one of these ultraviolet-curing resists.

The above substrate was covered by a photomask having a desired pattern, and the pattern area was cured by the application of ultraviolet light. Development was conducted to remove the non-cured area to obtain a colored pixel pattern 12 with a thickness of about 2.0 $\mu$m. This photolithographic process was repeated two more times by the use of the remaining two resists, whereby a color layer composed of red, blue and green sections was formed on the black matrix layer 12K. Next, an ITO film with a thickness of 2000 angstroms was formed as the transparent electrode layer 14 on the color layer 12 by sputtering. On top of this transparent electrode layer, alignment-controlling projections 16 were provided as zigzag lines with a bent angle of 90° arranged in parallel stripes (height=1.5 $\mu$m, bottom face width=10 $\mu$m) by the same photolithographic process as the above, using an ultraviolet-curing transparent negative resist ("Color Mosaic CT" manufactured by Fuji Hunt Electronics Technology Co., Ltd., Japan).

Spacers 18 were then formed on the alignment-controlling projections 16 at the turnings of the zigzag lines thereof. Specifically, 5-$\mu$m height projections were formed as the spacers 18 by the same photolithographic process as the above-described one, using an ultraviolet-curing transparent negative resist "NN700" manufactured by JSR Corporation, Japan. The spacers we tried to form at the turnings of the zigzag lines of the alignment-controlling projections were as follows: as shown in FIG. 3, the shape of the bottom face of the spacer was a square whose side length (10 $\mu$m) was equal to the width of the alignment-controlling projection, and the side faces of the spacer were substantially composed of those side faces that were parallel to the longer direction of the alignment-controlling projection and those side faces that were vertical to the same. Thereafter, the substrate on which the spacers had been provided was spin-coated with "JALS-688" manufactured by JSR Corporation, Japan, and the resultant was baked at 200° C. for 1 hour to form a vertical alignment layer 21 with a thickness of 700 angstroms. The laminate thus obtained is a color filter of the present invention.

(b) Production of Liquid Crystal Display

A glass substrate 26 was prepared as the substrate of an array that would face the color filter. A 2000-angstrom thick ITO film was formed as the driving electrode layer 22 on the glass substrate by sputtering. Since the purpose of this Example is to check disclination lines that may appear on a liquid crystal display, the driving electrode layer herein formed is a simple ITO film having no pixel pattern. However, in order to make the resulting liquid crystal display function practically, it is necessary to form the driving electrode layer in the following manner: an electrode is formed on each pixel by patterning through a known technique, and a thin-film transistor (TFT) is mounted on each pixel electrode so that it can control the pixel electrode. The transparent electrode layer side surface of the glass substrate was etched to form therein 10-$\mu$m wide slits 23 in the same shape as that of the alignment-controlling projections, in parallel with them. The transparent electrode layer 22 thus obtained was spin-coated with "JALS-688" manufactured by JSR Corporation, Japan, and the resultant was baked at 200° C. for 1 hour to form a vertical alignment layer 21 having a thickness of 700 angstroms, thereby obtaining an array 32.

Next, this array 32 and the color filter 30 produced in the above (a) were adhered to each other with the slit side surface of the array and the alignment-controlling projection side surface of the color filter faced so that one slit would be positioned at the center of the space between two neighboring alignment-controlling projections and that the slits and the alignment-controlling projections would be alternately arranged. By a vacuum filling process, the cells created were then filled with liquid crystals "MLC-6608", manufactured by Merck KGaA, Germany, having negative dielectric anisotropy, and the resultant was subjected to post-annealing at 110° C. for 1 hour to cancel the effect of flow alignment, thereby obtaining a liquid crystal display of the present invention.

Example 2
Evaluation of Liquid Crystal Display

To observe the alignment characteristics of liquid crystals in an MVA-LCD, a liquid crystal display useful for observing disclination lines was fabricated in the same manner as in Example 1, provided that the color layer and the black matrix layer were not formed in order to clearly observe disclination lines. It is considered that the disclination lines observed on this liquid crystal display similarly appear also on a liquid crystal display having a color layer and a black matrix layer. It is therefore believed that the evaluation herein obtained is applicable as it is to a liquid crystal display having a color layer and a black matrix layer.

Figure 6:
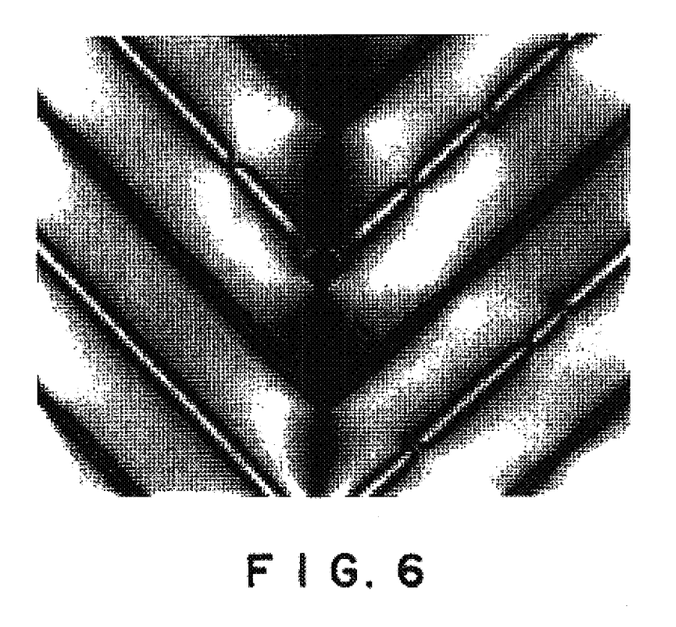
FIG. 6 is a polarization microphotograph of an MVA mode liquid crystal display of the present invention in which the spacers are provided on the alignment-controlling projections at the turnings of the zigzag lines thereof.

For the MVA-LCD obtained, the alignment of liquid crystals upon the application of a voltage of 2.0 V (1 kHz) was observed under the cross-nicol of a polarization microscope (Model BX 60, manufactured by OLYMPUS OPTICAL CO., LTD., Japan). The microphotograph is shown in FIG. 6.

Example 3

Figure 7:
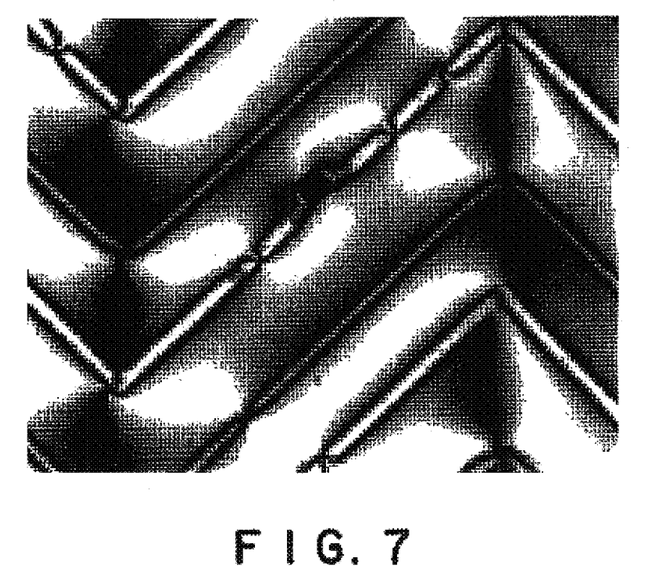
FIG. 7 is a polarization microphotograph of an MVA mode liquid crystal display of the present invention in which the spacers are provided on the alignment-controlling projections but not at the turnings of the zigzag lines thereof.

A color filter and a liquid crystal display were made in the same manner as in Example 2 except that the spacers were provided on the alignment-controlling projections but not on the turnings of the zigzag lines of the same, and the liquid crystal display obtained was evaluated. The microphotograph is shown in FIG. 7.

Comparative Example 1

Figure 8:
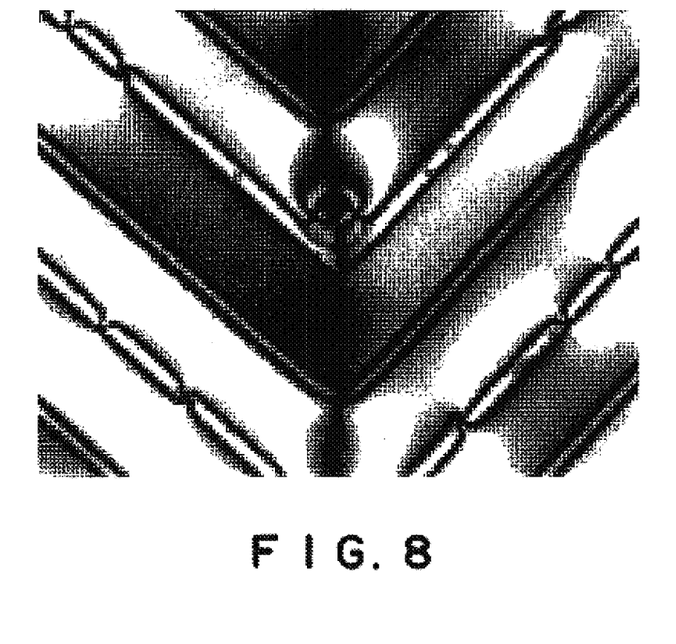
FIG. 8 is a polarization microphotograph of an MVA mode liquid crystal display in which pillar-like spacers are provided not on alignment-controlling projections but in the vicinity of the same on the line connecting the turnings of the zigzag lines of the same.

A color filter and a liquid crystal display were made in the same manner as in Example 1 except that pillar-like spacers were provided not on the alignment-controlling projections but in the vicinity of the same on the line connecting the turnings of the zigzag lines of the same, and the liquid crystal display obtained was evaluated. The microphotograph is shown in FIG. 8.

Comparative Example 2

Figure 9:
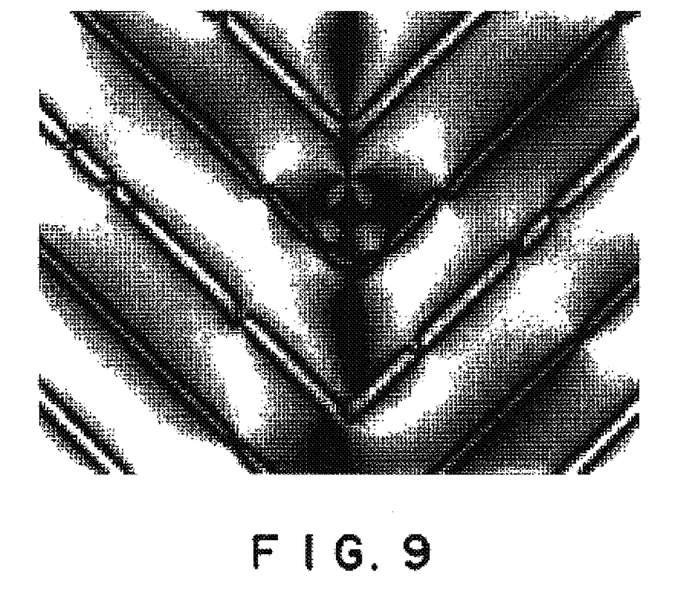
FIG. 9 is a polarization microphotograph of an MVA mode liquid crystal display in which pillar-like spacers are provided not on alignment-controlling projections but in the vicinity of slits on the line connecting the turnings of the zigzag lines of the alignment-controlling projections.

A color filter and a liquid crystal display were made in the same manner as in Example 1 except that pillar-like spacers were provided not on the alignment-controlling projections but in the vicinity of the slits on the line connecting the turnings of the zigzag lines of the alignment-controlling projections, and the liquid crystal display obtained was evaluated. The microphotograph is shown in FIG. 9.

Comparative Example 3

Figure 10:
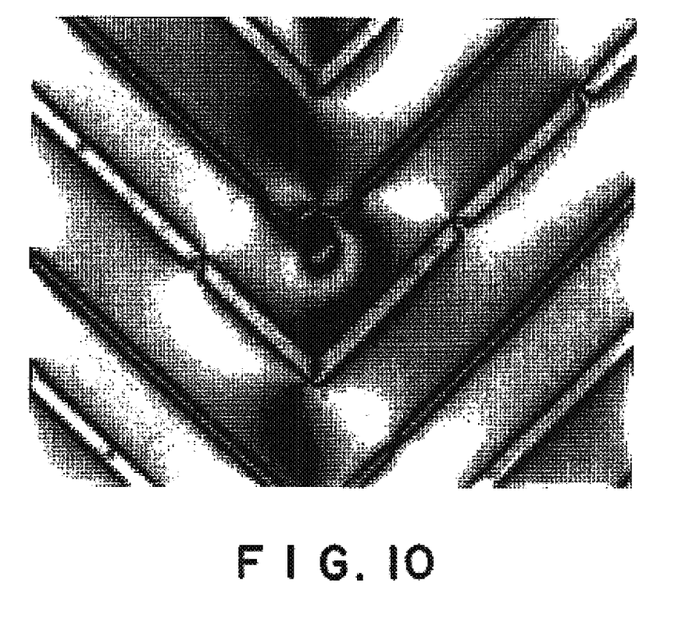
FIG. 10 is a polarization microphotograph of an MVA mode liquid crystal display in which pillar-like spacers are provided not on alignment-controlling projections but at the position which corresponds to the turnings of the zigzag lines of slits.

A color filter and a liquid crystal display were made in the same manner as in Example 1 except that pillar-like spacers were provided not on the alignment-controlling projections but at the position which corresponds to the turnings of the zigzag lines of slits, and the liquid crystal display obtained was evaluated. The microphotograph is shown in FIG. 10.

Comparative Example 4

Figure 11:
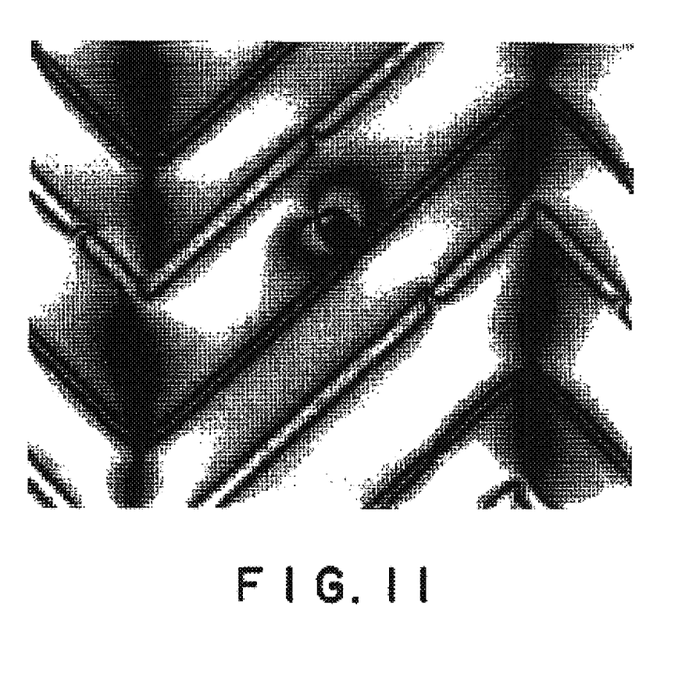
FIG. 11 is a polarization microphotograph of an MVA mode liquid crystal display in which pillar-like spacers are provided not on alignment-controlling projections and not on the lines connecting the turnings of the zigzag lines of the alignment-controlling projections.

A color filter and a liquid crystal display were made in the same manner as in Example 1 except that pillar-like spacers were provided not on the alignment-controlling projections and not on the line connecting the turnings of the zigzag lines of the same, and the liquid crystal display obtained was evaluated. The microphotograph is shown in FIG. 11.

Comparative Example 5

Figure 12:
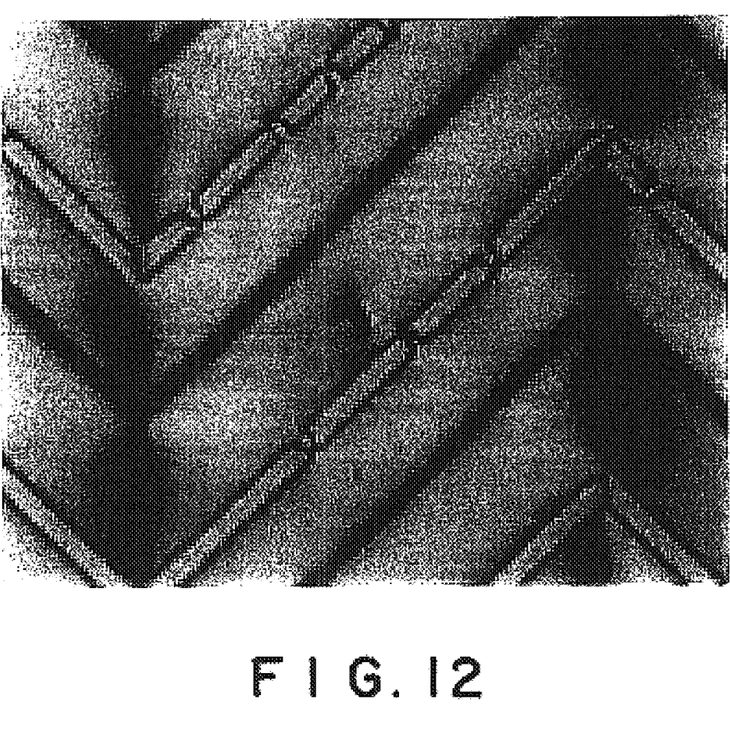
FIG. 12 is a polarization microphotograph of an MVA mode liquid crystal display using spacer beads as spacers.

A color filter and a liquid crystal display were made in the same manner as in Example 1 except that the spacers formed in Example 1 were replaced by spacer beads (particle diameter 5.0 $\mu$m, trade name "Micro Pearl SP-205" manufactured by SEKISUI FINE CHEMICAL CO., LTD., Japan), and the liquid crystal display obtained was evaluated. The microphotograph is shown in FIG. 12.

Results

As is clear from FIGS. 6 and 7, although the liquid crystal displays of Examples 1 and 2 had been provided with spacers, no disclination lines appeared due to the spacers. As can be known from these figures, although it was tried to form spacers, each having a square bottom face whose side length was equal to the width of the alignment-controlling projection, the practically formed spacers were found extending beyond the alignment-controlling projections, where the discrepancy between the spacer and the alignment-controlling projection was approximately 5 $\mu$m when measured at the base of the alignment-controlling projection. Even in this case, no disclination lines appeared due to the spacers. These examples show that it is not easy in the practical production process to make the side length of the bottom face of the spacer equal to the width of the alignment-controlling projection and to form the spacer completely coincident with the base of the alignment-controlling projection. Therefore, from the viewpoint of production process, it would rather be advantageous to allow the spacers to extend beyond the alignment-controlling projections to such an extent that no disclination lines appear.

FIGS. 8 to 11 show that disclination lines appeared on the liquid crystal displays of Comparative Examples 1 to 4 because the pillar-like spacers disturbed the alignment of liquid crystals controlled by the alignment-controlling projections. The luminance of transmitted light (i.e., the luminance) on the disclination line area became lower than that on the other area.

FIG. 12 shows that dark dots appeared because of the spacer beads in the effective display area on the liquid crystal display of Comparative Example 5 when displaying is in the light state.

In the liquid crystal displays of the above Examples and Comparative Examples, the alignment-controlling projections are provided as zigzag lines arranged in parallel stripes. The lines connecting the turnings of these zigzag lines are displayed as dark lines due to disclination as shown in FIGS. 6 to 12. On the other hand, in a conventional MVA-LCD, no electric field is generated in the gaps between the patterned driving electrodes, that is, the gaps between pixels defined by black matrix, so that these gaps are always displayed as dark areas. In view of this phenomenon, the alignment-controlling projections are arranged so that the turnings of the zigzag lines of the same will come on these gaps. Further, the lines connecting the turnings, existing in pixels are displayed as dark lines as described above, so that a supplemental capacitor is provided to shield light.

What is claimed is:

1. A multi-domain vertical alignment mode liquid crystal display comprising:

a driving electrode layer in which driving electrodes corresponding to pixels are two-dimensionally arranged;

a transparent electrode layer for generating, together with the driving electrode layer, an electric field between driving electrode layer and the transparent electrode layer, provided in parallel with the driving electrode layer at a predetermined distance;

spacers for keeping the predetermined distance, provided as pillars or ribs between the driving electrode layer and the transparent electrode layer;

a liquid crystal layer comprising liquid crystals having negative dielectric anisotropy, placed between the driving electrode layer and the transparent electrode layer;

vertical alignment layers for vertically aligning the liquid crystals, respectively provided on the driving electrode layer side surface and the transparent electrode layer side surface of the liquid crystal layer;

alignment-controlling projections for controlling the direction of alignment of the liquid crystals, linearly provided on the liquid crystal layer side surface of the driving electrode layer and/or that of the transparent electrode layer; and a color layer having a colored pixel pattern of two or more colors, wherein the spacers are provided over the alignment-controlling projections; each spacer has at least one pair of side faces that are parallel to the linear direction of the alignment-controlling projection; and the area of the alignment-controlling projection encompasses the area of the spacer, or the area of the spacer partially or entirely extends beyond the area of the alignment-controlling projection, the gap between the alignment-controlling projection and the side face of the spacer extending beyond the alignment-controlling projection in the latter case being not more than 7 $\mu$m when observed in the vertical direction against the driving electrode layer, and wherein the alignment-controlling projections are provided as zigzag lines arranged in parallel stripes, each zigzag line having turnings at a predetermined interval with a bent angle of 90 degrees.

2. The multi-domain vertical alignment mode liquid crystal display according to claim 1, wherein the spacers are tapered, and extend from the bases of the alignment-controlling projections.

3. The multi-domain vertical alignment mode liquid crystal display according to claim 1, wherein the spacers are provided on the alignment-controlling projections at the turnings of the zigzag lines thereof.

4. The multi-domain vertical alignment mode liquid crystal display according to claim 3, further comprising a black matrix layer in the color layer or separately from the color layer, wherein at least a part of the turnings of the zigzag lines of the alignment-controlling projections are masked by the black matrix layer for light shielding.

5. The multi-domain vertical alignment mode liquid crystal display according to claim 4, wherein at least a part of the spacers are in the area in which an image is effectively displayed without being shaded by the black matrix layer.

6. The multi-domain vertical alignment mode liquid crystal display according to claim 3, wherein the driving electrode layer has a supplemental capacitor, and at least a part of the turnings of the zigzag lines of the alignment-controlling projections are masked by the supplemental capacitor for light shielding.

7. The multi-domain vertical alignment mode liquid crystal display according to claim 1, wherein the spacer has side faces substantially composed of those side faces that are parallel to the linear direction of the alignment-controlling projection and those side faces that are perpendicular to the same.

8. The multi-domain vertical alignment mode liquid crystal display according to claim 1, wherein the spacer has a height of 1 to 10 $\mu$m.

9. The multi-domain vertical alignment mode liquid crystal display according to claim 1, wherein the spacers are formed by the use of an ultraviolet sensitive resin.

10. The multi-domain vertical alignment mode liquid crystal display according to claim 1, wherein the spacers are formed by the use of a negative resist.

11. The multi-domain vertical alignment mode liquid crystal display according to claim 1, wherein the spacers and/or the alignment-controlling projections are colored.

12. The multi-domain vertical alignment mode liquid crystal display according to claim 1, wherein the spacers and/or the alignment-controlling projections are transparent.

13. The multi-domain vertical alignment mode liquid crystal display according to claim 1, wherein the alignment-controlling projections are formed either on the driving electrode layer or on the transparent electrode layer, and the driving electrode layer or transparent electrode layer on which the alignment-controlling projections are not formed has linear cut-out slits so that an electric field will be generated in a predetermined direction between the electrode layer and the alignment-controlling projections.

14. The multi-domain vertical alignment mode liquid crystal display according to claim 13, wherein the slits are formed in the same shape as that of the alignment-controlling projections and in parallel with them.

15. The multi-domain vertical alignment mode liquid crystal display according to claim 14, wherein the slits are linearly provided so that, when observed in the vertical direction against the driving electrode layer, one slit can be positioned at the middle of two neighboring lines of the alignment-controlling projections, and that the slits and the alignment-controlling projections will be arranged alternately in stripes.

16. The multi-domain vertical alignment mode liquid crystal display according to claim 1, wherein the driving electrode layer is supported by a substrate.

17. The multi-domain vertical alignment mode liquid crystal display according to claim 16, wherein the substrate is transparent.

18. The multi-domain vertical alignment mode liquid crystal display according to claim 16, wherein the color layer is provided between the driving electrode layer and the substrate.

19. The multi-domain vertical alignment mode liquid crystal display according to claim 1, wherein the driving electrode layer is transparent.

20. The multi-domain vertical alignment mode liquid crystal display according to claim 1, wherein the transparent electrode layer is supported by a transparent substrate.

21. The multi-domain vertical alignment mode liquid crystal display according to claim 20, wherein the color layer is provided between the transparent electrode layer and the transparent substrate.

22. The multi-domain vertical alignment mode liquid crystal display according to claim 1, wherein a backlight is provided outside the driving electrode layer or the transparent electrode layer.

23. A color filter for use in a multi-domain vertical alignment mode liquid crystal display, comprising:
   a substrate,
   a color layer having a colored pixel pattern of two or more colors, formed on the substrate,
   an electrode layer formed on the color layer,
   alignment-controlling projections for controlling the direction of alignment of liquid crystals, linearly provided on the electrode layer, and
   spacers for maintaining the thickness of the liquid crystals, provided as pillars or ribs over the alignment-controlling projections,
wherein the spacer has at least one pair of side faces that are parallel to the linear direction of the alignment-controlling projection; and the area of the alignment-controlling projection encompasses the area of the spacer, or the area of the spacer partially or entirely extends beyond the area of the alignment-controlling projection, the gap between the alignment-controlling projection and the side face of the spacer extending beyond the alignment-controlling projection in the latter case being not more than 7 $\mu$m when observed n the vertical direction against the substrate, and
   wherein the alignment-controlling projections are provided as zigzag lines arranged in parallel stripes, each zigzag line having turnings at a predetermined interval with a bent angle of 90 degrees.

24. The color filter according to claim 23, wherein a vertical alignment layer for vertically aligning the liquid crystals is formed on the electrode side outermost surface of the color filter.

25. The color filter according to claim 23, wherein the electrode layer is a driving electrode layer in which driving electrodes corresponding to pixels are two-dimensionally arranged.

26. The color filter according to claim 25, wherein the driving electrode layer is transparent.

27. The color filter according to claim 26, wherein the substrate is transparent.

28. The color filter according to claim 23, wherein both the substrate and the electrode layer are transparent.

29. The color filter according to claim 23, wherein the spacers are tapered, and extend from the bases of the alignment-Controlling projections.

30. The color filter according to claim 23, wherein the spacers are provided on the alignment-controlling projections at the turnings of the zigzag lines thereof.

31. The color filter according to claim 23, wherein the spacer has side faces substantially composed of those side faces that are parallel to the linear direction of the alignment-controlling projection and those side faces that are perpendicular to the same.

32. The color filter according to claim 23, wherein the spacer has a height of 1 to 10 µm.

33. The color filter according to claim 23, wherein the spacers are formed by the use of an ultraviolet sensitive resin.

34. The color filter according to claim 33, wherein the spacers are formed by the use of a negative resist.

35. The color filter according to claim 23, further comprising a black matrix layer in the color layer or separately from the color layer, wherein at least a part of the turnings of the zigzag lines of the alignment-controlling projections are masked by the black matrix layer for light shielding.

36. The color filter according to claim 35, wherein at least a part of the spacers are in the area in which an image is effectively displayed without being shaded by the black matrix layer.

37. The color filter according to claim 23, wherein the driving electrode layer has a supplemental capacitor, and at least a part of the turnings of the zigzag lines of the alignment-controlling projections are masked by the supplemental capacitor for light shielding.

38. The color filter according to claim 23, wherein the spacers and/or the alignment-controlling projections are colored.

39. The color filter according to claim 23, wherein the spacers and/or the alignment-controlling projections are transparent.

40. The color filter according to claim 23 for use in a multi-domain vertical alignment mode liquid crystal display.

* * * * *